United States Patent [19]
Lowell, Jr.

[11] 3,858,966
[45] Jan. 7, 1975

[54] APPARATUS FOR FACILITATING TRAILER HITCH ELEMENT ALIGNMENT

[76] Inventor: Percival Davis Lowell, Jr., 505 Talbot Hall Rd., Norfolk, Va. 23505

[22] Filed: Jan. 2, 1974

[21] Appl. No.: 429,782

[52] U.S. Cl. .................. 350/307, 116/28, 280/477, 350/288
[51] Int. Cl. ............................................. G02b 5/10
[58] Field of Search ....... 280/477; 116/28; 350/307, 350/288

[56] References Cited
UNITED STATES PATENTS

| | | | |
|---|---|---|---|
| 2,736,885 | 2/1956 | Thompson | 116/28 R X |
| 3,524,701 | 8/1970 | Strohmeier | 350/307 |
| 3,767,230 | 10/1973 | DeVries | 280/477 |
| 3,767,292 | 10/1973 | Rutkowski | 350/307 X |

Primary Examiner—Leo Friaglia
Assistant Examiner—Randall A. Schrecengost
Attorney, Agent, or Firm—J. Maxwell Carson, Jr.

[57] ABSTRACT

Apparatus for facilitating the substantially vertical alignment of a trailer hitch element carried by a moving draft vehicle with a trailer hitch element carried by a stationary trailer vehicle, including a device for linearly interconnecting, within the limits thereof, such trailer vehicle and such draft vehicle having a portion connected at an extremity thereof to the rear of such draft vehicle on the centerline thereof and having another portion thereof positioned above such trailer vehicle carried trailer hitch element interconnected with such trailer vehicle for rotation with respect to a substantially vertically disposed axis passing substantially centrally through such trailer vehicle carried trailer hitch element. The apparatus also includes a mirror positioned above such device for linearly interconnecting, within the limits thereof, such trailer vehicle and such draft vehicle and similarly rotatable therewith about such substantially vertically disposed axis, such mirror facing towards the rear of such moving draft vehicle to afford the operator thereof a reflected view of at least a portion of such trailer vehicle carried trailer hitch element as well as with a reflected view of at least a portion of such device for linearly interconnecting, within the limits thereof, such trailer vehicle and such draft vehicle. The apparatus further includes an indicator element positioned above such mirror and viewable thereover under certain circumstances although preferably facing in a direction opposite the direction in which such mirror faces; such indicator element also being similarly rotatable with respect to such substantially vertically disposed axis together with such mirror and with such device for linearly interconnecting, within the limits thereof, such trailer vehicle and such draft vehicle.

10 Claims, 9 Drawing Figures

PATENTED JAN 7 1975
3,858,966
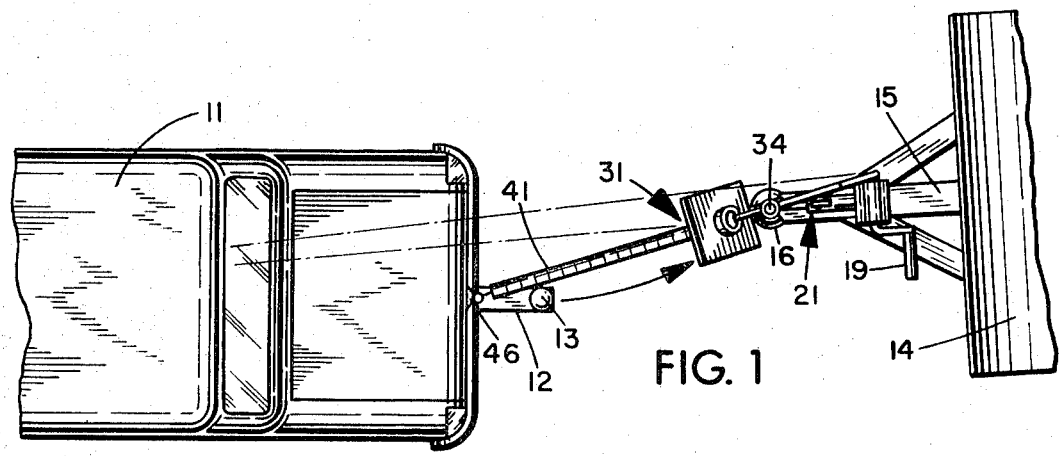
FIG. 1
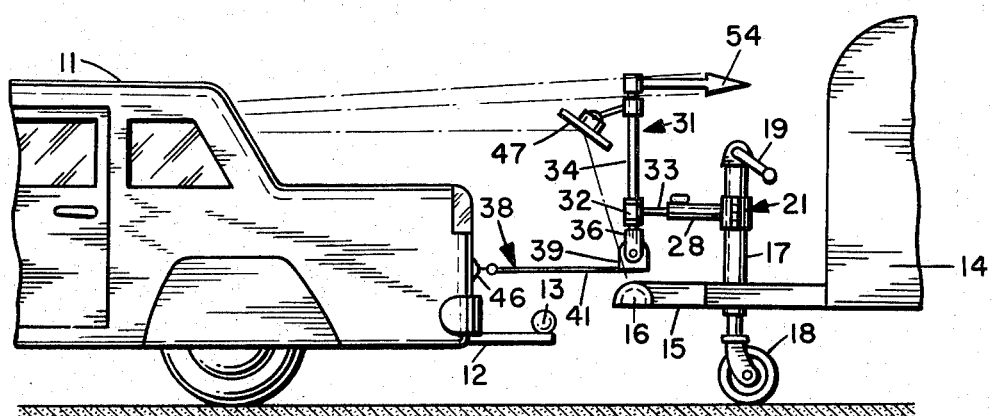
FIG. 2
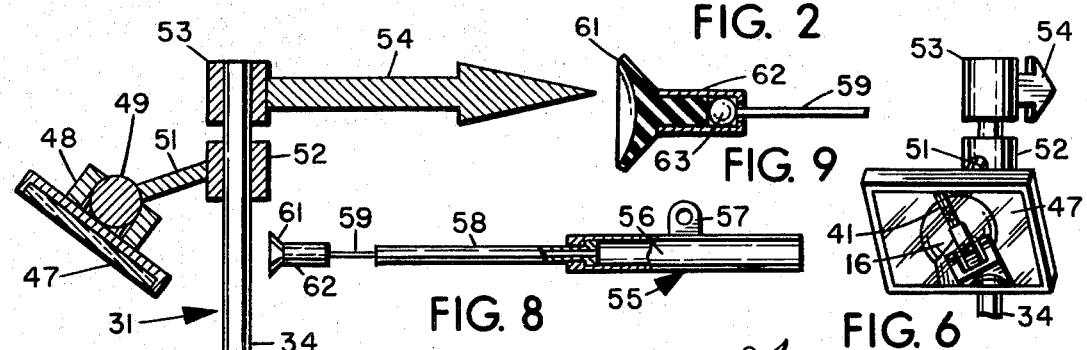
FIG. 3
FIG. 8
FIG. 9
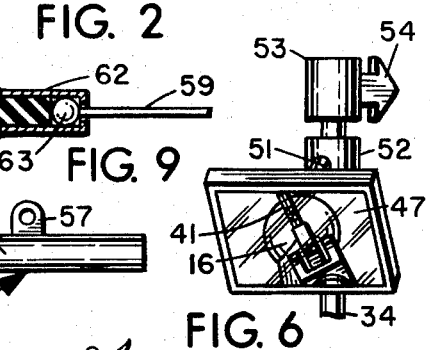
FIG. 6
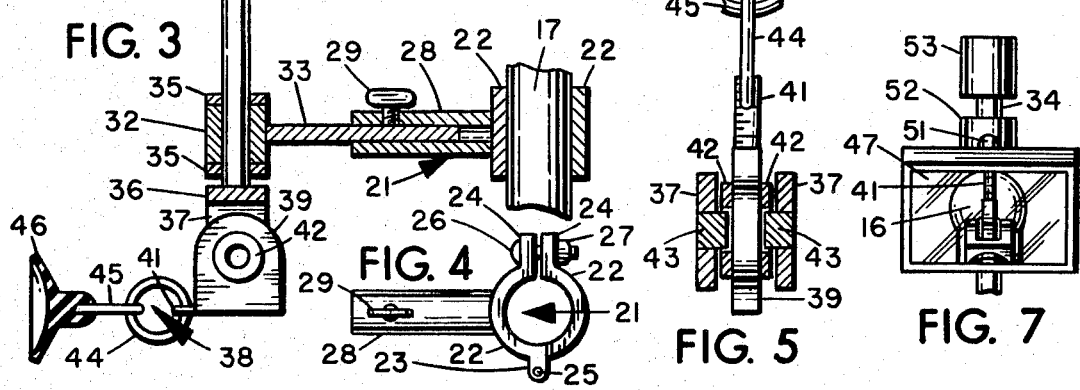
FIG. 4
FIG. 5
FIG. 7

APPARATUS FOR FACILITATING TRAILER HITCH ELEMENT ALIGNMENT

This invention relates generally to apparatus for facilitating the substantially vertical alignment of a first trailer hitch element carried by a moving draft vehicle and a second trailer hitch element carried by a stationary trailer vehicle for subsequent interconnection, and more particularly to apparatus of this type including means for broadly providing the operator of such a draft vehicle with a visual indication of the correctness or incorrectness of the approach of the draft vehicle carried trailer hitch element toward the trailer vehicle carried trailer hitch element, and further including means for providing such draft vehicle operator with a reflected view of a device linearly interconnecting, within the limits thereof, such trailer vehicle and such draft vehicle regardless of the distance therebetween, as well as with a reflected view of such trailer hitch elements as they approach substantial vertical alignment.

Heretofore, the operator of a draft vehicle such as an automobile or the like carrying a first trailer hitch element desirous of interconnecting therewith a cooperating second trailer hitch carried by a trailer vehicle has, in most instances, merely backed such draft vehicle towards such trailer vehicle while unable to observe the relative positions of such trailer hitch elements. Such a draft vehicle operator has heretofore then found it necessary to dismount from the same and walk towards the rear thereof to inspect the positioning of such trailer hitch elements, usually to find the vertical misalignment of the same to be too great to readily permit the interconnection thereof, necessitating the repetition of the hereinbefore described operation one or more times until such trailer hitch elements are approximately vertically aligned. Even then, such a draft vehicle operator has heretofore ordinarily found it to be necessary, usually with the assistance of others, to manually move the trailer vehicle until the trailer hitch element carried thereby is in vertical alignment with the draft vehicle carried trailer hitch element before proceeding to interconnect the same.

The problems involved in bringing such trailer hitch elements into vertical alignment in order to interconnect the same, as outlined hereinbefore, have previously led others to propose apparatus for obviating such problems. Along such lines, apparatus of mechanical nature useable for such a purpose is shown, for example, in U.S. Pat. No. 2,736,885 (116–28 XR) granted on Feb. 28, 1956 to W. L. Thompson and in U.S. Pat. No. 2,815,732 (116–28) issued to J. C. Majors on Dec. 10, 1957, as well as in U.S. Pat. No. 3,015,162 (116–28 XR) granted on Jan. 2, 1962 to H. C. Bohnet, in U.S. Pat. No. 3,159,917 (280–477 XR) issued to S. E. Whitehead on Dec. 8, 1964, and in U.S. Pat. No. 3,363,318 (116–28 XR) granted on Jan. 16, 1968 to L. B. Folkins et al. Further, various types of apparatus intended for the purpose of alleviating the hereinbefore outlined problem and which are characterized by the use of electrical circuitry therein are also disclosed U.S. Pat. No. 2,797,406 (280–511 XR) granted on June 25, 1957 to D. Tanis et al., and in U.S. Pat. No. 3,418,628 (280–511 XR) issued to G. D. Fenner on Dec. 24, 1968. While it appears that such prior art apparatus is adequately functionable for the attainment of the contemplated objectives thereof, it is nevertheless considered that a more satisfactory solution of the hereinbefore outlined problem is desirable, and consequently the present application is drawn to apparatus for facilitating trailer hitch element alignment deemed to provide a more satisfactory solution of such problem in which certain deficiencies of the hereinbefore cited prior art apparatus in this field are eliminated, and which provides advantages not obtainable with such prior art apparatus.

Accordingly, an object of the present invention is the provision of apparatus for facilitating the vertical alignment of a first trailer hitch element carried by a moving draft vehicle with a second trailer hitch element carried by a stationary trailer vehicle.

Another object of the instant invention is the provision of apparatus for providing the operator of a moving draft vehicle carrying a first trailer hitch element with a visual indication of the accuracy of the approach thereof towards a second trailer hitch element carried by a stationary trailer vehicle, as well as with a view of such trailer hitch elements as they begin to come into substantially vertical alignment.

A further object of the present invention is the provision of apparatus including means for providing the operator of a moving draft vehicle carrying a first trailer hitch element with a view of an indicator normally visible during at least a portion of an incorrect approach of such first trailer hitch element towards a second trailer hitch element carried by a stationary trailer vehicle, and further including means for providing such draft vehicle operator with a reflected view of a device linearly interconnecting such moving draft vehicle and such stationary trailer vehicle as well as with a reflected view of such trailer hitch elements as they begin to come into substantially vertical alignment.

According to the instant invention, the foregoing and other objects are obtained by providing, on a trailer vehicle carrying a downwardly opening socket type trailer hitch element, apparatus including a substantially vertically disposed, elongated, cylindrically shaped, longitudinally rotatable shaft member mounted above such socket type trailer hitch element; such shaft member being substantially in longitudinal alignment with the center of such socket type trailer hitch element. Such elongated shaft member has a lower extremity operationally spaced above the upper central surface of such socket type trailer hitch element, and a clevis is rigidly secured to the lower extremity of such shaft member to rotate therewith; the parallelly disposed, spaced jaws of such clevis extending downwardly towards such socket type trailer hitch element. A circular aperture is formed through each of the jaws of such clevis in a conventional manner; such circular apertures having a common centerline perpendicularly intersecting a downward extension of the longitudinal centerline of such shaft member. Such clevis is utilized in the mounting of a device adapted to linearly interconnect, within the limits thereof, such trailer vehicle and a draft vehicle regardless of the distance therebetween; the extremity of such device most remotely positionable from such clevis carrying a conventional rubber suction cup joined thereto by suitable swivel type connecting means. When such draft vehicle is close enough to such trailer vehicle, such suction cup is attached to the rear of the body of such draft vehicle on the centerline thereof; such suction cup being vertically moveable until it is positionable against a suitable portion of such draft vehicle body inasmuch as such device carrying the same is interconnected with such clevis for rotation about the centerline of the circular apertures formed through the jaws thereof. The apparatus according to the instant invention also includes a mirror interconnected with such shaft member at a point spaced somewhat beneath the upper extremity thereof; such mirror facing in the same direction that the device for linearly interconnecting such trailer vehicle and such draft vehicle extends from such trailer vehicle towards such draft vehicle. Such mirror carried by such shaft member is stiffly rotatable with respect to at least a substantially horizontally extending axis substantially parallel to the common centerline of the circular apertures formed through the jaws of the mentioned clevis; such mirror thereby being positionable to permit an observer stationed at some distance more or less directly forward thereof, with his eye more or less at the elevation thereof, to obtain therein a reflected view of at least a portion of the upper surface of such trailer vehicle carried socket type trailer hitch element. Further, the apparatus according to the present invention includes an indicator element of the directional arrow type mounted on such shaft member adjacent the upper extremity thereof and substantially horizontally projecting outwardly therefrom in a direction opposite to the direction that the device for linearly interconnecting such trailer vehicle and such draft vehicle extends from such trailer vehicle towards such draft vehicle; such indicator element being viewable by an observer above such mirror unless such shaft member is interposed between the eye of such observer and the length of such indicator element.

The rotational nature of such shaft member allows such device linearly interconnecting such trailer vehicle and such draft vehicle to project forwardly from such trailer vehicle at an angle with respect to the longitudinal centerline thereof, when necessary, for proper interconnection with such draft vehicle. If such draft vehicle, with the centerline thereof directed straight towards the socket type trailer hitch element carried by such trailer vehicle, is backed straight towards such trailer vehicle, the operator thereof, although possibly unable to view the directional arrow type indicator element carried by such shaft member, would be able to obtain in such mirror a centrally located and substantially vertically directed view of a portion of such device linearly interconnecting such trailer vehicle and such draft vehicle as well as a view of a portion of such socket type trailer hitch element carried by such trailer vehicle. Further, as a ball type trailer hitch element carried by such draft vehicle on the centerline thereof and rearwardly of the body thereof begins to move into the close vicinity of the trailer vehicle carried socket type trailer hitch element, such ball type trailer hitch element would also come into view in such mirror, and the operator of such draft vehicle would then be enabled to maneuver the same until both of the trailer hitch elements at least partially shown in such mirror are brought into substantially vertical alignment. Also, if the centerline of such draft vehicle is not directed straight towards the socket type trailer hitch element carried by such trailer vehicle when such device linearly interconnecting such trailer vehicle and such draft vehicle is initially attached to such draft vehicle, the operator thereof would be provided with a view of such directional arrow type indicator element, and would then turn the rear of such draft vehicle in the direction indicated thereby as it is backed towards such trailer vehicle to bring the longitudinal centerline of such draft vehicle into alignment with the socket type trailer hitch element carried by such trailer vehicle.

A more complete appreciation of the invention and many of the attendant advantages thereof will be readily apparent as the same becomes better understood by reference to the following detailed description when considered in connection with the accompanying drawing wherein:

FIG. 1 is a plan view of a draft vehicle and a trailer vehicle initially linked by the device for linearly interconnecting the same, within the limits thereof, included in the apparatus according to the present invention carried by the trailer vehicle;

FIG. 2 is a side elevational view of the linked draft vehicle and trailer vehicle as such draft vehicle is backed towards such trailer vehicle while in proper alignment with the trailer hitch element carried by such trailer vehicle;

FIG. 3 is an enlarged side elevational view, partially in section, of the apparatus according to the instant invention, as well as of a device for mounting the same on a trailer vehicle;

FIG. 4 is a plan view of the device for mounting the apparatus according to the present invention on the trailer vehicle;

FIG. 5 is a partial plan view of a device for linearly interconnecting, within the limits thereof, the draft vehicle and the trailer vehicle regardless of the distance therebetween, and includes a sectional view of the elements utilized in the interconnection of the same with the remainder of the apparatus according to the instant invention carried by the trailer vehicle;

FIG. 6 is an elevational view of the mirror and the indicator element provided in the apparatus according to the present invention carried by the trailer vehicle showing the same as viewed by the operator of a draft vehicle misaligned with respect to the trailer vehicle carried trailer hitch element;

FIG. 7 is an elevational view of the mirror and the indicator element provided in the apparatus according to the instant invention carried by the trailer vehicle showing the same as viewed by the operator of a draft vehicle properly aligned with respect to the trailer vehicle carried trailer hitch element;

FIG. 8 is a side elevational view, partially in section, of an alternative device for linearly interconnecting, within the limits thereof, the draft vehicle and the trailer vehicle regardless of the distance therebetween, that may be provided in the apparatus according to the present invention carried by the trailer vehicle; and FIG. 9 is an enlarged side elevational view, partially in section, of the extremity of the device shown in FIG. 8 attachable to the draft vehicle.

Referring now more particularly to the drawing, wherein like reference numerals designate the same or identical parts throughout the several views, and more specifically to FIGS. 1 and 2, there is shown a draft vehicle 11, such as an automobile or the like, provided with an elongated metallic element 12 rigidly interconnected therewith and extending rearwardly therefrom on the longitudinal centerline thereof. A conventional, metallic, ball type trailer hitch element 13 is rigidly connected to the upper surface of the elongated element 12 adjacent the rearward extremity thereof.

The trailer vehicle 14 adapted to be drawn by the draft vehicle 11 is provided with an elongated metallic member 15 projecting forwardly from the body thereof on the centerline thereof. A conventional, metallic, downwardly opening socket type trailer hitch element 16 is rigidly connected to the elongated member 15 at the forward extremity thereof; the hollow interior of the trailer hitch element 16 being adapted to be lowered down over at least the greater portion of the spherical trailer hitch element 13 in a conventional manner to enclose such trailer hitch element 13 when the interconnection of such trailer hitch elements is to be accomplished. Other conventional means, of course, not shown in the drawing in the interest of illustrative clarity, are further employed to prevent the inadvertent vertical disengagement of such trailer hitch elements when they have been interengaged as set forth hereinbefore.

The elongated member 15 projecting forwardly from the body of trailer vehicle 14, at a suitable point spaced rearwardly from the trailer hitch element 16 and forwardly of the body of trailer vehicle 14, conventionally carries an upwardly extending, metallic, tubular element 17 having at least the cylindrically walled hollow interior thereof in communication with a circular aperture vertically formed through the elongated member 15. Conventional jackscrew means provided within the tubular element 17 are interconnected with a single front trailer wheel 18 positioned beneath the elongated member 15 and are operable to elevate or depress such wheel 18 relative to the elongated member 15; such jack-screw means being actuated when a crank 19 provided at the upper extremity of such tubular element 17 is turned in the appropriate direction.

The substantially vertically extending tubular element 17 carries a device, generally designated by the reference numeral 21, utilized for mounting the apparatus according to the present invention on the trailer vehicle 14. More explicitly, the device 21, as best seen in FIGS. 3 and 4 of the drawing, includes a collar made up of a pair of preferably identical, metallic, substantially semicircular components 22 each having an arcuate inner surface adapted to extend substantially closely around one half of the cylindrical side wall of the tubular element 17. Each of such components 22 of the device 21 are provided with hinge means 23 at one of the linear extremities of the arcuate inner surface thereof and with a centrally bored planar element 24 at the other of the linear extremities of the arcuate inner surface thereof. When such components 22 of the device 21 are interconnected by means of a suitable metallic hinge pin at hinge line 25, they are then positioned to tightly substantially completely encircle the tubular element 17 at a desired operational level, bringing the planar elements 24 thereof into somewhat spaced face-to-face relation with the bores formed therethrough in longitudinal alignment. A bolt 26 is then inserted through the aligned bores provided in the planar elements 24 of the components 22 of device 21, and a nut 27 is next turned down upon the free end of such bolt 26 to force the planar elements 24 of the components 22 of device 21 into closer proximity, thereby tightly clamping the device 21 to the tubular element 17.

The device 21 also includes a metallic tubular member 28 rigidly connected to the exterior of one of the components 22 thereof as by welding or the like; such tubular member 28 being arranged to operationally project forwardly from the interconnected component 22 of device 21 above and parallelly to the longitudinal centerline of the elongated member 15 of trailer vehicle 14. The tubular member 28 of device 21 has an operationally forward extremity positioned rearwardly of the trailer hitch element 16 carried by the trailer vehicle 14, and carries adjacent such forward extremity thereof a conventional setscrew 29 positioned in a tapped aperture provided in the wall thereof and extending between the exterior and the interior thereof.

The apparatus according to the instant invention utilized for facilitating the substantially vertical alignment of the trailer hitch element 13 carried by draft vehicle 11 with the trailer hitch element 16 carried by trailer vehicle 14, generally designated by the reference numeral 31, and shown in FIG. 3 of the drawing as well as in FIGS. 1 and 2 thereof, includes a cylindrically shaped, metallic bearing element 32 having a circular bore longitudinally and centrally formed therethrough. A metallic cylindrical rod 33 is externally rigidly connected to the bearing element 32 at about the longitudinal midpoint thereof as by welding or the like and projects outwardly therefrom; an extension of the centerline of such rod 33 perpendicularly intersecting the centerline of the circular bore formed through the bearing element 32. The free end of such rod 33 is substantially snugly insertable into the hollow and cylindrically shaped interior of the tubular member 28 of the device 21 carried by the tubular element 17 of trailer vehicle 14, and the length of such rod 33 is such that when a considerable portion thereof has been inserted into the hollow interior of tubular member 28 of the device 21 the bearing element 32 connected to the forwardmost extremity thereof may be positioned with the centerline of the bore formed therethrough substantially parallel to the longitudinal centerline of the tubular element 17; the centerline of the bore formed through the bearing element 32 also being aligned with the center of the trailer hitch element 16 carried by trailer vehicle 14 at a distance substantially vertically therebeneath. When the bearing element has been so positioned, the setscrew 29 is utilized to tightly clamp such rod 33 within the interior of tubular member 28 of device 21 for maintaining such positioning of such bearing element 32.

Apparatus 31 further includes an elongated, cylindrically shaped, metallic shaft member 34 snugly rotatably positioned in the bore through the bearing element 32 thereof; a metallic ring element 35 encircling and being rigidly connected as by welding or the like to such shaft member 34 just above the bearing element 32 and another such metallic ring element 35 encircling and being similarly rigidly connected to such shaft member 34 just beneath the bearing element 32. The ring elements 35 substantially eliminate longitudinal movement of shaft member 34 within the bore formed through such bearing element 32 without, of course, interfering in any manner with rotational movement of such shaft member 34 within the bore formed through such bearing element 32. The shaft member 34, obviously, together with the bore formed through bearing element 32, is operationally longitudinally aligned with the center of the trailer hitch element 16 carried by trailer vehicle 14.

The shaft member 34 of apparatus 31 has a lower extremity situated just beneath the lowermost of the ring elements 35 connected thereto, and a metallic clevis 36 is rigidly connected to the lower extremity of such shaft member 34 as by welding or the like. The spaced, parallelly disposed jaws 37 of clevis 36 extend downwardly from the substantially horizontally disposed, planar portion thereof connected to the shaft member 34; a circular aperture being provided in each of the jaws 37 of clevis 36 in a conventional manner. The circular apertures formed through the jaws 37 of clevis 36 have a common centerline, of course, which perpendicularly intersects a downward extension of the longitudinal centerline of the shaft member 34 of apparatus 31.

Apparatus 31 includes a device, generally designated by the reference numeral 38, adapted to linearly interconnect, within the limits thereof, trailer vehicle 14 and draft vehicle 11. Such device 38 may include conventional measuring means of the type provided with a compact metallic housing 39 having spring biased reel means rotatably mounted therein capable of carrying tightly and compactly reeled thereon a measuring rule 41 formed of a narrow, elongated strip of thin springy steel. The rule 41 has a free end normally slightly projecting from a suitable slot provided in the housing 39 which may be manually grasped by a user and drawn upon to extract a desired portion of the length of such rule 41 from such housing 39; such length of such rule 41 being unwound from the reel mounted in the housing 39 against the action of the spring means provided within such housing 39 and interconnected therewith. The length of the rule 41 drawn from such housing 39, in cross-sectional configuration, is normally somewhat bowed or arcuate from edge to edge thereof, and the operational longitudinal linearity of such length of rule 41 is thereby maintained; the springy steel of which rule 41 is formed permitting the same to flatten out in cross-sectional configuration, however, as such length of such rule 41 is allowed to reenter such housing 39 for rewinding on the reel provided therein. The housing 39, which is provided with planar and parallelly disposed side walls, carries a metallic ring element 42 centrally and rigidly connected, as by welding or the like, to each of such side walls thereof; the central circular apertures of such ring elements 42 being disposed on a common centerline either operationally coinciding with the rotational centerline of the reel mounted within such housing 39 or being substantially parallel thereto although slightly spaced therefrom. Such housing 39 is rotatably mounted between the jaws 37 of clevis 36. As best seen in FIG. 5 of the drawing, in which such housing 39 and rule 41 of device 38 are shown in plan view, and in which the jaws 37 of clevis 36 as well as the ring elements 42 carried by such housing 39 are shown in section as taken on a substantially horizontal plane at the level of the centerline of the circular apertures formed through the jaws 37 of clevis 36 and through the ring elements 42, when such housing 39 is disposed between the jaws 37 of clevis 36, a suitable cylindrically shaped mounting stud 43 or the like may be inserted through the aperture formed through each of the jaws 37 of clevis 36 and at least partially into the central aperture of the adjacent ring element 42 carried by such housing 39. Each of the mounting studs 43, also shown in section in FIG. 5 of the drawing, is operationally maintained in the aperture formed through a jaw 37 of clevis 36 as by a press fit or the like, and extends into the aperture formed through the adjacent ring element 42 loosely enough to permit such ring element 42 to rotate relatively thereto and yet snugly enough to maintain the rotational centerline of the reel mounted within such housing 39 either substantially parallel to the centerline of the apertures formed through the jaws 37 of clevis 36 or substantially coinciding therewith, as set forth hereinbefore.

The device 38 also includes a ring 44 passing through a suitable aperture formed through the rule 41 adjacent the free end thereof, as well as another ring 45 interlinked with such ring 44; such ring 45 also passing through an aperture transversely provided in the substantially cylindrical shank portion of a conventional rubber suction cup element 46. When the draft vehicle 11 is close enough to trailer vehicle 14, a length of the rule 41 of device 38 may be drawn out of the housing 39 thereof to allow such suction cup element 46 to be conventionally attached to the rear of the body of draft vehicle 11 on the centerline thereof. Even if the longitudinal centerline of such withdrawn portion of rule 41 is at an angle with respect to the longitudinal centerline of trailer vehicle 14, there will be no undesirable distortion of such rule 41 as a consequence thereof, since the shaft member 34 of apparatus 31 readily rotates in the bore formed through the bearing element 32 thereof to keep the side walls of the housing 39 parallel to the longitudinal centerline of the length of rule 41 extending therefrom. Further, if it is necessary to attach the suction cup element 46 of device 38 to draft vehicle 11 at a point above or beneath the operational elevation of such housing 39, again there will be no undesirable distortion of such rule 41 as a result thereof inasmuch as such housing 39 is freely rotatably between the jaws 37 of clevis 36, as hereinbefore set forth. Also, inasmuch as the interlinked rings 44 and 45 interconnecting the suction cup element 46 of device 38 to the rule 41 thereof effectively permit such suction cup element 46 to freely swivel with respect to such rule 41, no undesirable distortion of rule 41 will occur when such suction cup element 46 is attached to the draft vehicle 11 as contemplated herein. When such draft vehicle 11 and such trailer vehicle 14 are interconnected by means of the device 38 as hereinbefore set forth, the draft vehicle 11 may be backed towards the trailer hitch element 16 carried by the trailer vehicle 14 in any one of a wide variety of possible approaches, and as the draft vehicle 11 approaches the trailer vehicle 14 the spring means interconnected with the reel provided within housing 39 act to reel the outwardly projecting portion of the length of rule 41 back into such housing 39 at a corresponding rate. It will therefore be seen that the device 38 of apparatus 31 may be quite aptly referred to as a device or means "adapted to linearly interconnect, within the limits thereof, a trailer vehicle and a draft vehicle regardless of the distance therebetween."

Apparatus 31 also includes a mirror 47 interconnected with the shaft member 34 thereof at a point spaced somewhat beneath the upper extremity of such shaft member 34. The mirror 37 operationally faces in the same direction that the device 38 adapted to linearly interconnect, within the limits thereof, the trailer vehicle 14 and the draft vehicle 11 extends from the vicinity of the lower extremity of such shaft member 34 of apparatus 31 towards such draft vehicle 11, and is operationally maintained at an elevation at which the reflective surface thereof, positioned as hereinafter described, will be readily visible in its entirety to an operator of such draft vehicle 11 through the rear window thereof. In so mounting such mirror 47, which rigidly carries centrally disposed adjacent the rear or non-reflective surface thereof the metallic socket element 48 of a conventional ball and socket type swivel joint having engaged therewith the metallic ball element 49 of such swivel joint, a metallic rod 51 rigidly connected as by welding or the like at one of the ends thereof to such ball element 49 of such swivel joint is also rigidly connected as by welding or the like at the other of the ends thereof to a metallic collar element 52 closely encircling and rigidly connected as by welding or the like to such shaft member 34 of apparatus 31. Such rod 51 extends somewhat downwardly from such collar element 52 towards such swivel joint in the same direction that the device 38 adapted to linearly interconnect, within the limits thereof, such trailer vehicle 14 and such draft vehicle 11 extends from the vicinity of the lower extremity of such shaft member 34 of apparatus 31 towards such draft vehicle 11. Such mirror 47 is operationally positioned to have a first axis lying in the plane of the reflective surface thereof and passing through the center thereof disposed parallelly to the centerline of the apertures formed through the jaws 37 of clevis 36 of apparatus 31, and also to have a second axis lying in the plane of the reflective surface thereof perpendicular to such first axis and likewise passing through the center of such reflective surface of mirror 47 disposed in such a manner that an extension thereof will intersect the longitudinal centerline of such shaft member 34 of apparatus 31. The ball and socket type swivel joint interconnecting such mirror 47 and the rod 51 is loose enough to permit such mirror 47 to be positioned as hereinbefore described in such a manner that the operator of the moving draft vehicle 11 will be able to view at least a portion of the trailer hitch element 16 carried by trailer vehicle 14 reflected therein, and such swivel joint is also stiff enough to operationally maintain such mirror 47 in such position.

Apparatus 31 further includes a collar element 53 encircling the shaft member 34 thereof at the upper extremity of such shaft member 34; such collar element 53 being formed of a suitable metal and being rigidly connected as by welding or the like to such shaft member 34. The collar element 53 carries an indicator element 54 also formed of a suitable metal and rigidly connected thereto as by welding or the like operationally substantially horizontally projecting outwardly therefrom, preferably in a direction opposite to the direction that the device 38 adapted to linearly interconnect, within the limits thereof, such trailer vehicle 14 and such draft vehicle 11 regardless of the distance therebetween extends from the vicinity of the lower extremity of such shaft member 34 towards such draft vehicle 11. Although such indicator element 54 is shown in the drawing as having the shape of a directional arrow formed of thin sheet material, it will be apparent that other shapes may also be utilized, and that even a length of ordinary elongated cylindrical rod would suffice therefor.

When the apparatus 31 has been mounted on a trailer vehicle 14 as set forth hereinbefore, the operator of a draft vehicle 11 desirous of interconnecting the trailer hitch element 13 carried thereby with the trailer hitch element 16 carried at such time at a somewhat higher elevation by such trailer vehicle 14 would back such draft vehicle 11 towards such trailer vehicle carried trailer hitch element 16 until the rear of such draft vehicle 11 is close enough thereto to permit the operator of such draft vehicle 11 to dismount therefrom, grasp the suction cup element 46 or a ring 44 or 45 of device 38 and therewith manually draw a length of rule 41 thereof from the housing 39 thereof sufficient to permit such suction cup element 46 to contact a suitable point on the rear surface of draft vehicle 11 on the centerline thereof, and then attach such suction cup element 46 to draft vehicle 11 at such point. The operator of draft vehicle 11, when he has resumed operation of the same, may then look towards apparatus 31 either directly through the rear window of such draft vehicle 11 or indirectly by utilizing the rear view mirror carried by such draft vehicle 11. If the centerline of such draft vehicle 11 at such time is misaligned with respect to the trailer hitch element 16 carried by trailer vehicle 14 in such a manner that a rearward extension of the centerline of such draft vehicle 11 would pass to the right of the trailer vehicle carried trailer hitch element 16, the operator of such draft vehicle 11 would obtain a view of the mirror 47 and indicator element 54 of apparatus 31 substantially as depicted in FIG. 6 of the drawing. In such a case, mirror 47 shows the rule 41 of device 38 to be extending towards such draft vehicle 11 in a rightwardly as well as forwardly direction, and the indicator element 54 is shown extending in a leftwardly as well as rearwardly direction for directing the operator of draft vehicle 11 to turn the rear thereof towards the left as he backs the same towards the trailer hitch element 16 carried by the trailer vehicle 14. It will be noted, of course, that the hereinbefore described misalignment of the centerline of draft vehicle 11 with respect to the trailer vehicle carried trailer hitch element 16 is the opposite of that illustrated in FIG. 1 of the drawing, which would, however, also be analogously indicated by the mirror 47 and indicator element 54 of apparatus 31 in the manner depicted in FIG. 6 of the drawing. In any event, as the approach of moving draft vehicle 11 towards the trailer hitch element 16 carried by trailer vehicle 14 is subsequently corrected in accordance with the showing made by the mirror 47 and the indicator element 54 of apparatus 31 as depicted, by way of example, in FIG. 6 of the drawing, to bring the centerline of draft vehicle 11 into alignment with the trailer vehicle carried trailer hitch element 16, the operator of draft vehicle 11 would then obtain in the mirror 47 of apparatus 31 a reflected view of a portion of the rule 41 of device 38 as well as a view of a portion of such trailer vehicle carried trailer hitch element 16 as depicted in FIG. 7 of the drawing, in which indicator element 54 is concealed from view behind the shaft member 34 of apparatus 31 and the collar element 53 mounted thereon. As draft vehicle 11 with the centerline thereof maintained in alignment with the trailer vehicle carried trailer hitch element 16 is then backed even closer towards trailer vehicle 14, a portion of the trailer hitch element 13 carried by draft vehicle 11 will also come into view in the mirror 47 of apparatus 31. The draft vehicle 11 may then be appropriately maneuvered until such trailer hitch element 13 carried thereby is positioned substantially vertically beneath the trailer hitch element 16 carried by trailer vehicle 14, as shown in mirror 47 of apparatus 31. The operator of draft vehicle 11 may then dismount therefrom, operate the crank 19 to lower such trailer vehicle carried trailer hitch element 16 onto such draft vehicle carried trailer hitch element 13 and to subsequently raise the front trailer wheel 18 out of contact with the ground, and then proceed to conventionally complete the interengagement of such trailer hitch elements as mentioned hereinbefore.

It will be obvious, of course, that indicator element 54 of apparatus 31 could be mounted on the shaft member 34 thereof to operationally substantially horizontally project therefrom in the same direction in which the mirror 47 of apparatus 31 faces, if deemed desirable. In such a case, the indicator element 54 of apparatus 31 would point out to the operator of draft vehicle 11 the direction in which the centerline thereof is misaligned with respect to the trailer vehicle carried trailer hitch element 16, rather than indicating the direction in which the rear of draft vehicle 11 should be turned as it is backed closer towards the trailer vehicle 14 to bring the centerline of such draft vehicle 11 into alignment with such trailer vehicle carried trailer hitch element 16.

It will further be apparent to one skilled in the art that the apparatus 31 could include a device adapted to linearly interconnect, within the limits thereof, the trailer vehicle 14 and the draft vehicle 11 differing from the device 38 hereinbefore described. Such an alternative device, generally designated by the reference numeral 55, as illustrated in FIG. 8 of the drawing, includes a first cylindrically shaped metallic tubular component 56 having a conventional metallic padeye 57 rigidly connected thereto as by welding or the like and arranged to project radially outwardly from the cylindrical external surface of the side wall thereof at a desired location; such padeye 57 conventionally being provided with a circular aperture formed therethrough having the centerline thereof disposed perpendicularly to a plane in which the longitudinal centerline of such tubular component 56 of device 55 lies. The device 55 may be interconnected with the remainder of apparatus 31, in lieu of the device 38 described hereinbefore, by substantially snugly positioning such padeye 57 between the jaws 37 of clevis 36 of apparatus 31 with the circular aperture formed through such padeye 57 in longitudinal alignment with the circular apertures formed through such jaws 37 of clevis 36 of apparatus 31, by then passing a bolt, not illustrated, through all of such aligned apertures, and by next turning a nut, not illustrated, down on the threads carried by the free end of such bolt to secure such padeye 57 between such jaws 37 of clevis 36 of apparatus 31 for rotation with respect to the centerline of such bolt.

The device 55 of apparatus 31, which may be broadly referred to as a telescoping device, further includes a second cylindrically shaped metallic tubular element 58 substantially snugly and substantially completely disposable within the hollow interior of the tubular component 56 thereof; a greater part of the length of such tubular element 58 of device 55 being rather freely slidable out of one of the ends of such component 56 thereof operationally disposed nearest the rear of draft vehicle 11. Conventional detent means, illustrated in section in FIG. 8 of the drawing, are provided to prevent a portion of the length of the tubular element 58 of telescoping device 55 from being withdrawn from the interior of the tubular component 56 thereof sufficient to maintain the longitudinal alignment of such tubular element 58 and such tubular component 56 of telescoping device 55 when such tubular element 58 thereof is withdrawn from such tubular component 56 thereof to the maximum extent. Such telescoping device 55 may further include a third cylindrically shaped metallic tubular element 59 substantially snugly positionable within the hollow interior the the tubular element 58 thereof; a greater part of the length of such tubular element 59 of telescoping device 55 disposable in the tubular element 58 thereof being rather freely slidable from the end of such tubular element 58 operationally positionable nearest the rear of draft vehicle 11. Conventional detent means are also provided for retaining a portion of such length of tubular element 59 of telescoping device 55 within the interior of the tubular element 58 thereof at all times to maintain the longitudinal alignment of such tubular elements 59 and 58 of telescoping device 55 when such tubular element 59 thereof is withdrawn from such tubular element 58 thereof to the maximum extent.

Of course, further telescoping elements may be provided in the telescoping device 55 of apparatus 31 if deemed desirable; such further telescoping elements being carried by and positionable within such tubular element 59 thereof similarly to the manner in which the tubular elements 59 and 58 thereof are carried by the tubular component 56 thereof. If, on the other hand, such additional telescoping elements are not provided in the telescoping device 55 of apparatus 31, then the tubular element 59 thereof may be formed as a solid cylindrical rod without a hollow interior.

The telescoping device 55 of apparatus 31 also includes a conventional rubber suction cup element 61 interconnected with the extremity of the tubular element 59 thereof operationally positionable nearest draft vehicle 11 in such a manner as to rather freely swivel with respect thereto. More explicitly, as shown in FIG. 9 of the drawing, such rubber suction cup element 61 includes a cylindrically shaped shank portion positionable within the completely open end of a cylindrically shaped metallic sleeve element 62; such sleeve element 62 having an aperture centrally provided in an end wall located at the other end thereof. The extremity of the tubular element 59 of telescoping device 55 of apparatus 31 operationally positionable nearest the draft vehicle 11 loosely extends into the sleeve element 62 thereof through such centrally apertured end wall of such sleeve element 62, and a metallic ball 63 is rigidly connected as by welding or the like to such extremity of such tubular element 59. The diameter of such ball 63 thus positioned within the cylindrically shaped hollow interior of such sleeve element 62 is greater than the diameter of the aperture provided in such end wall thereof, and such ball 63 is only slightly smaller in diameter than the interior of such sleeve element 62; such ball 63 carried by such tubular element 59 of telescoping device 55 thereby being inextricable from such sleeve element 62 thereof through such centrally apertured end wall of such sleeve element 62. The shank portion of such suction cup element 61 of telescoping device 55 is operationally positioned to extend into such completely open end of such sleeve element 62 thereof, as mentioned hereinbefore; the free end of such shank portion of such suction cup element 61 of telescoping device 55 substantially contacting such ball 63 positioned within such sleeve element 62 of such telescoping device 55 at the apertured end wall thereof. The shank portion of such suction cup element 61 of telescoping device 55 may be secured within such sleeve element 62 thereof as by adhesive bonding, or as by conventional fasteners transversely extending completely through such suction cup element 61 and such sleeve element 62 of telescoping device 55 of apparatus 31.

It will be apparent that apparatus 31 including telescoping device 55 will function to obtain results similar to apparatus 31 including the device 38.

Obviously, many other modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. Apparatus for facilitating the substantially vertical alignment of a draft vehicle carried trailer hitch element with a cooperating trailer vehicle carried trailer hitch element, comprising:

a device for linearly interconnecting, within the limits thereof, said draft vehicle and said trailer vehicle, said device including a component interconnected with said trailer vehicle and operationally positioned above said trailer vehicle carried trailer hitch element on a substantially vertically disposed axis passing substantially centrally through said trailer vehicle carried trailer hitch element, said component being operationally rotatable with respect to said substantially vertically disposed axis, said device further including an element interengaged with said component thereof having an extremity operationally most remotely positionable from said component of said device interconnectable with the rear of the body of said draft vehicle at a point on the centerline thereof, said element of said device operationally substantially linearly and operationally substantially rigidly extending from the vicinity of said point on the rear of the body of said draft vehicle towards said component of said device regardless of variations in the distance between said draft vehicle and said trailer vehicle; and a mirror interconnected with said trailer vehicle and operationally positioned above said device for linearly interconnecting, within the limits thereof, said draft vehicle and said trailer vehicle, said mirror operationally substantially facing in the direction of said point on the rear of the body of said draft vehicle and being adapted to provide the operator thereof with a reflected view of at least a portion of said trailer vehicle carried trailer hitch element, said mirror also being operationally rotatable with respect to said substantially vertically disposed axis together with said component of said device for linearly interconnecting, within the limits thereof, said draft vehicle and said trailer vehicle.

2. Apparatus according to claim 1, wherein an indicator element is interconnected with said trailer vehicle in a position to be viewed above said mirror by an operator of said draft vehicle, said indicator element also being operationally rotatable with respect to said substantially vertically disposed axis together with said mirror and said device for linearly interconnecting, within the limits thereof, said draft vehicle and said trailer vehicle.

3. Apparatus according to claim 1, wherein a cylindrically shaped, elongated shaft member is rotatably mounted on said trailer vehicle, the longitudinal centerline of said shaft member coinciding with said substantially vertically disposed axis passing substantially centrally through said trailer vehicle carried trailer hitch element, wherein said component of said device for linearly interconnecting, within the limits thereof, said draft vehicle and said trailer vehicle is interconnected with the operationally lower extremity of said shaft member for rotation therewith, and wherein said mirror is interconnected with said shaft member at a point beneath the operationally upper extremity thereof for rotation therewith.

4. Apparatus according to claim 3, wherein an indicator element is interconnected with the operationally upper extremity of said shaft member for rotation therewith, said indicator element being viewable above said mirror by an operator of said draft vehicle.

5. Apparatus according to claim 3, wherein said component of said device for linearly interconnecting, within the limits thereof, said draft vehicle and said trailer vehicle is a housing of the type adapted to carry compactly reeled therein a flexible metallic measuring rule, said housing component further being interconnected with the operationally lower extremity of said shaft member for rotation about an axis substantially perpendicularly intersecting a lower extension of said centerline of said shaft member, and wherein said element of said device for linearly interconnecting, within the limits thereof, said draft vehicle and said trailer vehicle interengaged with said housing component of said device is a flexible metallic measuring rule, said measuring rule having a cross-sectional configuration adapted to substantially rigidly maintain in a substantially linear condition any portion of the length thereof withdrawn from said housing component, said extremity of said measuring rule operationally most remotely positionable from said housing component carrying attached thereto to swivel with respect thereto an element connectable to said point on the rear of the body of said draft vehicle, any length of said measuring rule withdrawn from said housing component to effect the interconnection of said draft vehicle and said trailer vehicle being retractable into said housing component as said draft vehicle subsequently approaches said trailer vehicle at a rate corresponding to the rate at which said draft vehicle approaches said trailer vehicle.

6. Apparatus according to claim 5, wherein an indicator element is interconnected with the operationally upper extremity of said shaft member for rotation therewith, said indicator element being viewable above said mirror by an operator of said draft vehicle.

7. Apparatus according to claim 6, wherein said indicator element projects outwardly from said shaft member in a direction opposite to the direction in which said mirror interconnected with said shaft member faces.

8. Apparatus according to claim 3, wherein said component of said device for linearly interconnecting, within the limits thereof, said draft vehicle and said trailer vehicle is elongated and tubular, said tubular component of said device further being interconnected with the operationally lower extremity of said shaft member for rotation about an axis substantially perpendicularly intersecting a lower extension of said centerline of said shaft member, the longitudinal centerline of said tubular component of said device thereby being alignable with said point on the rear of the body of said draft vehicle, and wherein said element of said device for linearly interconnecting, within the limits thereof, said draft vehicle and said trailer vehicle interengaged with said tubular component of said device is an elongated element having a longitudinal centerline operationally maintained at all times in alignment with said longitudinal centerline of said tubular component of said device, said elongated element of said device interengaged with said tubular component thereof being substantially completely disposable within said tubular component thereof and being at least partially withdrawable therefrom, said extremity of said elongated element of said device operationally most remotely positionable from said tubular component thereof carrying attached thereto to swivel with respect thereto an element connectable to said point on the rear of said body of said draft vehicle, any length of said elongated element of said device withdrawable from said tubular component thereof to effect the interconnection of said draft vehicle and said trailer vehicle being repositionable therein as said draft vehicle subsequently approaches said trailer vehicle.

9. Apparatus according to claim 8, wherein an indicator element is interconnected with the operationally upper extremity of said shaft member for rotation therewith, said indicator element being viewable above said mirror by an operator of said draft vehicle.

10. Apparatus according to claim 9, wherein said indicator element projects outwardly from said shaft member in a direction opposite to the direction in which said mirror interconnected with said shaft member faces.

* * * * *